United States Patent
Sawaf

(10) Patent No.: US 9,530,161 B2
(45) Date of Patent: Dec. 27, 2016

(54) AUTOMATIC EXTRACTION OF MULTILINGUAL DICTIONARY ITEMS FROM NON-PARALLEL, MULTILINGUAL, SEMI-STRUCTURED DATA

(71) Applicant: eBay Inc., San Jose, CA (US)

(72) Inventor: Hassan Sawaf, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 38 days.

(21) Appl. No.: 14/194,606

(22) Filed: Feb. 28, 2014

(65) Prior Publication Data
US 2015/0248400 A1 Sep. 3, 2015

(51) Int. Cl.
G06F 17/27 (2006.01)
G06Q 30/06 (2012.01)
G06F 17/28 (2006.01)

(52) U.S. Cl.
CPC ....... *G06Q 30/0609* (2013.01); *G06F 17/2809* (2013.01); *G06F 17/28* (2013.01); *G06F 17/2827* (2013.01); *G06F 17/2845* (2013.01); *G06F 17/2854* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/289
See application file for complete search history.

(56) References Cited

U.S. PATENT DOCUMENTS

| | | | |
|---|---|---|---|
| 5,477,450 A | * | 12/1995 | Takeda ............... G06F 17/271 704/2 |
| 5,912,986 A | | 6/1999 | Shustorovich |
| 6,028,956 A | | 2/2000 | Shustorovich et al. |
| 6,490,549 B1 | | 12/2002 | Ulicny et al. |
| 6,865,528 B1 | | 3/2005 | Huang et al. |

(Continued)

FOREIGN PATENT DOCUMENTS

| EP | 1398759 A2 | 3/2004 |
|---|---|---|
| EP | 1855211 A2 | 11/2007 |

(Continued)

OTHER PUBLICATIONS

"International Application Serial No. PCT/US2015/017833, International Search Report mailed Jul. 1, 2015", 2 pgs.

(Continued)

*Primary Examiner* — Richard Zhu
(74) *Attorney, Agent, or Firm* — Schwegman, Lundberg & Woessner, P.A.

(57) ABSTRACT

User interfaces receive a first plurality of user queries and result sets that are in a category, exhibit a constraint, and exhibit user behavior. Also received are a second plurality of user queries and result sets that that are in the category, exhibit the constraint, and exhibit user behavior. The second user queries and results are received either from a plurality of user interfaces coupled to a second system, or from the second system itself. Responsive to detecting that the first plurality of user queries and result sets and the second plurality of user queries and result sets satisfy respective thresholds, a signal indicates that at least one of the first plurality of user queries and at least one of the second plurality of user queries are translations of each other.

12 Claims, 7 Drawing Sheets

(56) References Cited

U.S. PATENT DOCUMENTS

| | | |
|---|---|---|
| 7,269,598 B2 | 9/2007 | Marchisio |
| 7,610,189 B2 | 10/2009 | Mackie |
| 7,716,039 B1 | 5/2010 | Bangalore et al. |
| 7,716,226 B2 | 5/2010 | Barney |
| 7,805,289 B2 * | 9/2010 | Zhou .................. G06F 17/2827 704/1 |
| 8,463,810 B1 | 6/2013 | Rennison |
| 8,732,151 B2 * | 5/2014 | Ali .................... G06F 17/30672 707/706 |
| 8,930,176 B2 * | 1/2015 | Li ...................... G06F 17/2854 704/2 |
| 9,053,202 B2 * | 6/2015 | Viswanadha ..... G06F 17/30899 |
| 2002/0107683 A1 | 8/2002 | Eisele |
| 2002/0111789 A1 * | 8/2002 | Hull .................... G06F 17/2795 704/4 |
| 2002/0198713 A1 | 12/2002 | Franz et al. |
| 2004/0029085 A1 | 2/2004 | Hu et al. |
| 2004/0181410 A1 | 9/2004 | Hwang |
| 2004/0243645 A1 | 12/2004 | Broder et al. |
| 2005/0005237 A1 | 1/2005 | Rail et al. |
| 2005/0015217 A1 | 1/2005 | Weidl et al. |
| 2005/0228640 A1 | 10/2005 | Aue et al. |
| 2005/0289168 A1 | 12/2005 | Green et al. |
| 2006/0142995 A1 | 6/2006 | Knight et al. |
| 2006/0241869 A1 | 10/2006 | Schadt et al. |
| 2007/0038386 A1 | 2/2007 | Schadt et al. |
| 2007/0185946 A1 | 8/2007 | Basri et al. |
| 2007/0209075 A1 | 9/2007 | Coffman |
| 2008/0025617 A1 | 1/2008 | Posse et al. |
| 2008/0040095 A1 | 2/2008 | Sinha et al. |
| 2008/0077384 A1 * | 3/2008 | Agapi .................. G06F 17/289 704/2 |
| 2008/0077391 A1 | 3/2008 | Chino et al. |
| 2008/0114581 A1 | 5/2008 | Meir et al. |
| 2008/0133245 A1 | 6/2008 | Proulx et al. |
| 2008/0154577 A1 | 6/2008 | Kim et al. |
| 2008/0262826 A1 | 10/2008 | Pacull |
| 2008/0270109 A1 | 10/2008 | Och |
| 2009/0018821 A1 | 1/2009 | Sadamasa et al. |
| 2009/0070099 A1 | 3/2009 | Anisimovich et al. |
| 2009/0157380 A1 | 6/2009 | Kim et al. |
| 2009/0265230 A1 | 10/2009 | Plachouras et al. |
| 2009/0265290 A1 | 10/2009 | Ciaramita et al. |
| 2010/0004919 A1 | 1/2010 | Macherey et al. |
| 2010/0004920 A1 | 1/2010 | Macherey et al. |
| 2010/0070521 A1 | 3/2010 | Clinchant et al. |
| 2010/0138211 A1 * | 6/2010 | Shi .................... G06F 17/2845 704/3 |
| 2010/0179803 A1 | 7/2010 | Sawaf et al. |
| 2010/0180244 A1 | 7/2010 | Kalafala et al. |
| 2010/0280818 A1 * | 11/2010 | Childers ............ G06F 17/2845 704/2 |
| 2011/0082683 A1 | 4/2011 | Soricut et al. |
| 2012/0109623 A1 * | 5/2012 | Dolan ................ G06F 17/2827 704/2 |
| 2012/0141959 A1 * | 6/2012 | von Ahn Arellano . G09B 19/06 434/157 |
| 2012/0158621 A1 | 6/2012 | Bennett et al. |
| 2012/0245924 A1 * | 9/2012 | Brun .................... G06F 17/2765 704/9 |
| 2012/0278244 A1 | 11/2012 | Lee et al. |
| 2012/0330974 A1 | 12/2012 | Zillner |
| 2013/0030787 A1 | 1/2013 | Cancedda et al. |
| 2013/0030788 A1 * | 1/2013 | Barbosa ............ G06F 17/30864 704/2 |
| 2013/0144594 A1 * | 6/2013 | Bangalore ......... G06F 17/2836 704/2 |
| 2014/0278346 A1 * | 9/2014 | Zomet .............. G06F 17/30707 704/3 |
| 2015/0248401 A1 | 9/2015 | Ruvini et al. |
| 2015/0248457 A1 | 9/2015 | Sawaf |
| 2015/0248718 A1 | 9/2015 | Delingat et al. |

FOREIGN PATENT DOCUMENTS

| | | |
|---|---|---|
| EP | 1983445 A2 | 10/2008 |
| EP | 2199925 A1 | 6/2010 |
| JP | 8190562 A | 7/1996 |
| JP | 2003030186 A | 1/2003 |
| JP | 2004220266 A | 8/2004 |
| JP | 2009075795 A | 4/2009 |
| JP | 2009294747 A | 12/2009 |
| KR | 2010031800 A | 3/2010 |
| WO | WO-0175662 A2 | 10/2001 |
| WO | WO-03042769 A1 | 5/2003 |
| WO | WO-2005017652 A2 | 2/2005 |
| WO | WO-2005081178 A1 | 9/2005 |
| WO | WO-2005096708 A2 | 10/2005 |
| WO | WO-2006042321 A2 | 4/2006 |
| WO | WO-2008019170 A2 | 2/2008 |
| WO | WO-2009038525 A1 | 3/2009 |
| WO | WO-2010003117 A2 | 1/2010 |
| WO | WO-2010036311 A2 | 4/2010 |
| WO | WO-2010046782 A3 | 4/2010 |
| WO | WO-2015130974 A1 | 9/2015 |
| WO | WO-2015130982 A1 | 9/2015 |
| WO | WO-2015130984 A2 | 9/2015 |
| WO | WO-2015130986 A1 | 9/2015 |

OTHER PUBLICATIONS

"International Application Serial No. PCT/US2015/017833, Written Opinion mailed Jul. 1, 2015", 4 pgs.

"International Application Serial No. No. PCT/US2015/017842, International Search Report mailed Jun. 3, 2015", 2 pgs.

"International Application Serial No. PCT/US2015/017842, Written Opinion mailed Jun. 3, 2015", 6 pgs.

"International Application Serial No. PCT/US2015/017845, International Search Report mailed Jun. 19, 2015", 2 pgs.

"International Application Serial No. PCT/US2015/017845, Written Opinion mailed Jun. 19, 2015", 5 pgs.

"International Application Serial No. PCT/US2015/017848, International Search Report mailed Jun. 8, 2015", 2 pgs.

"International Application Serial No. PCT/US2015/017848, Written Opinion mailed Jun. 8, 2015", 6 pgs.

"U.S. Appl. No. 12/606,110, Final Office Action mailed Jul. 19, 2013", 20 pgs.

"U.S. Appl. No. 12/606,110, Non Final Office Action mailed Jun. 2, 2015", 20 pgs.

"U.S. Appl. No. 12/606,110, Non Final Office Action mailed Dec. 28, 2012", 19 pgs.

"U.S. Appl. No. 12/606,110, Preliminary Amendment filed Nov. 9, 2009", 3 pgs.

"U.S. Appl. No. 12/606,110, Response filed Jan. 21, 2014 to Final Office Action mailed Jul. 19, 2013", 10 pgs.

"U.S. Appl. No. 12/606,110, Response filed Mar. 28, 2013 to Non Final Office Action mailed Dec. 28, 2012", 8 pgs.

"U.S. Appl. No. 12/606,110, Response filed Sep. 2, 2015 to Non Final Office Action mailed Jun. 2, 15", 9 pgs.

"International Application Serial No. PCT/IB2009/007438, International Preliminary Report on Patentability mailed may 5, 2011", 7 pgs.

"International Application Serial No. PCT/IB2009/007438, International Search Report mailed Apr. 27, 2010", 2 pgs.

"International Application Serial No. PCT/IB2009/007438, Written Opinion mailed Apr. 27, 2010", 5 pgs.

Ehara, Terumasa, "Rule Based Machine Translation Combined with Statistical Post Editor for Japanese to English Patent Translation", Department of Electronic Systems Engineering, Tokyo University of Science, Japan, (Sep. 2007), 4 pgs.

Eisele, et al., "Hybrid Machine Translation: Combining Rule-Based and Statistical MT Systems", EuroMatrix, (Apr. 2007), 36 pgs.

Eisele, Andreas, et al., "Hybrid Machine Translation Architectures within and beyond the EuroMatrix Project", 12th EAMT Conference, (Sep. 2008), 27-34.

(56) References Cited

OTHER PUBLICATIONS

Garcia-Varea, Ismael, et al., "Maximum Entropy Modeling: A Suitable Framework to Learn Context-Dependent Lexicon Modelsfor Statistical Machine Translation", Machine Learning 60, (2005), 135-158.
Och, Franz, et al., "A Systematic Comparison of Various Statistical Alignment Models", Association for Computational Linguistics, (2003), 19-51.
Sawaf, Hassan, et al., "Hybrid Machine Translation Applied to Media Monitoring", 8lh AMTA Conference, Hawaii., (Oct. 21-25, 2008), 440-447.
Sawaf, Hassan, et al., "On the Use of Grammar Based Language Models for Statistical Machine Translation", (Nov. 5, 1999), 1-13.
Sawaf, Hassan, "The AppTek MT System for the NIST Evaluation 2006—Hybrid Machine Translation for Broadcast, News, Dialect and Conversational Input in Arabic", AppTek Applications Technology, Inc.,, (Sep. 7, 2006), 11 pgs.
Ying, Liu, et al., "A Hybrid Approach to Chinese-English Machine Translation", 1997 IEEE International Conference on Intelligent Processing Systems, (Oct. 2007), 1146-1150.
U.S. Appl. No. 12/606,110, filed Oct. 26, 2009, Hybrid Machine Translation.
"U.S. Appl. No. 12/606,110, Advisory Action mailed Jul. 12, 2016", 4 pgs.
"U.S. Appl. No. 12/606,110, Final Office Action mailed Feb. 24, 2016", 20 pgs.
"U.S. Appl. No. 12/606,110, Response Filed Apr. 25, 2016 to Final Office Action mailed Feb. 24, 2016", 16 pgs.
"U.S. Appl. No. 14/194,582, Examiner Interview Summary mailed Jun. 7, 2016", 3 pgs.
"U.S. Appl. No. 14/194,582, Non Final Office Action mailed Mar. 30, 2016", 25 pgs.
"U.S. Appl. No. 14/194,582, Response filed Jun. 29, 2016 to Non Final Office Action mailed Mar. 30, 2016", 16 pgs.
International Application Serial No. PCT/US2015/017845, International Preliminary Report on Patentability mailed Sep. 15, 2016, 7 pgs.
International Application Serial No. PCT/US2015/017848, International Preliminary Report on Patentability mailed Sep. 15, 2016, 8 pgs.
U.S. Appl. No. 12/606,110, Non Final Office Action mailed Sep. 26, 2016, 20 pgs.

\* cited by examiner

AUTOMATIC EXTRACTION OF MULTILINGUAL DICTIONARY ITEMS FROM NON-PARALLEL, MULTILINGUAL, SEMI-STRUCTURED DATA

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay Inc. 2013, All Rights Reserved.

TECHNICAL FIELD

The present application relates generally to machine translation.

BACKGROUND

The use of mobile devices, such as cellphones, smartphones, tablets, and laptop computers, has increased rapidly in recent years, which, along with the rise in dominance of the Internet as the primary mechanism for communication, has caused an explosion in international communications and/or transactions, including electronic commerce ("ecommerce"). As these factors spread throughout the world, communications between users that utilize different spoken or written languages increase exponentially. International transactions pose unique challenges when dealing with differing languages because such transactions often require specific information to be highly accurate. For example, if a potential buyer asks a seller about some aspect of a product for sale, the answer should be precise and accurate. Any failing in the accuracy of the answer could result in a lost sale or an unhappy purchaser.

BRIEF DESCRIPTION OF THE DRAWINGS

Some embodiments are illustrated by way of example and not limitation in the figures of the accompanying drawings in which.

DETAILED DESCRIPTION

Example methods and systems for machine translation (MT) for international communications and/or transactions are provided. It will be evident, however, to one of ordinary skill in the art that the present inventive subject matter may be practiced without these specific details.

Machine translation is a subfield of computational linguistics that investigates the use of software to translate text or speech from one natural language to another. Machine translation relies heavily on parallel data, often called parallel corpora, for example, translated documents, but acquiring parallel corpora is a very time consuming and expensive, particularly domain specific corpora like ecommerce system data. Automatic multilingual dictionaries may be learned from the use of structured data that a commercial service (e.g., ecommerce site like that operated by eBay Inc.) has in its databases. A working assumption may be that consumer behavior can be modeled in different countries, and a mathematical model can be found to correlate user interest. With this, specific aspects, categories and images of products or services can be used to constrain the probabilities to identify units that are semantically similar, across languages. The information may be coded independently in taxonomies for different languages. Taxonomies, in this context, can be seen as a tree of information, and certain nodes of these trees can be aligned by using prior knowledge, even if that prior knowledge is limited, and with machine learning the nodes that are left out can be assumed to be aligned as well, and the probability of this alignment can be estimated.

Figure 1:
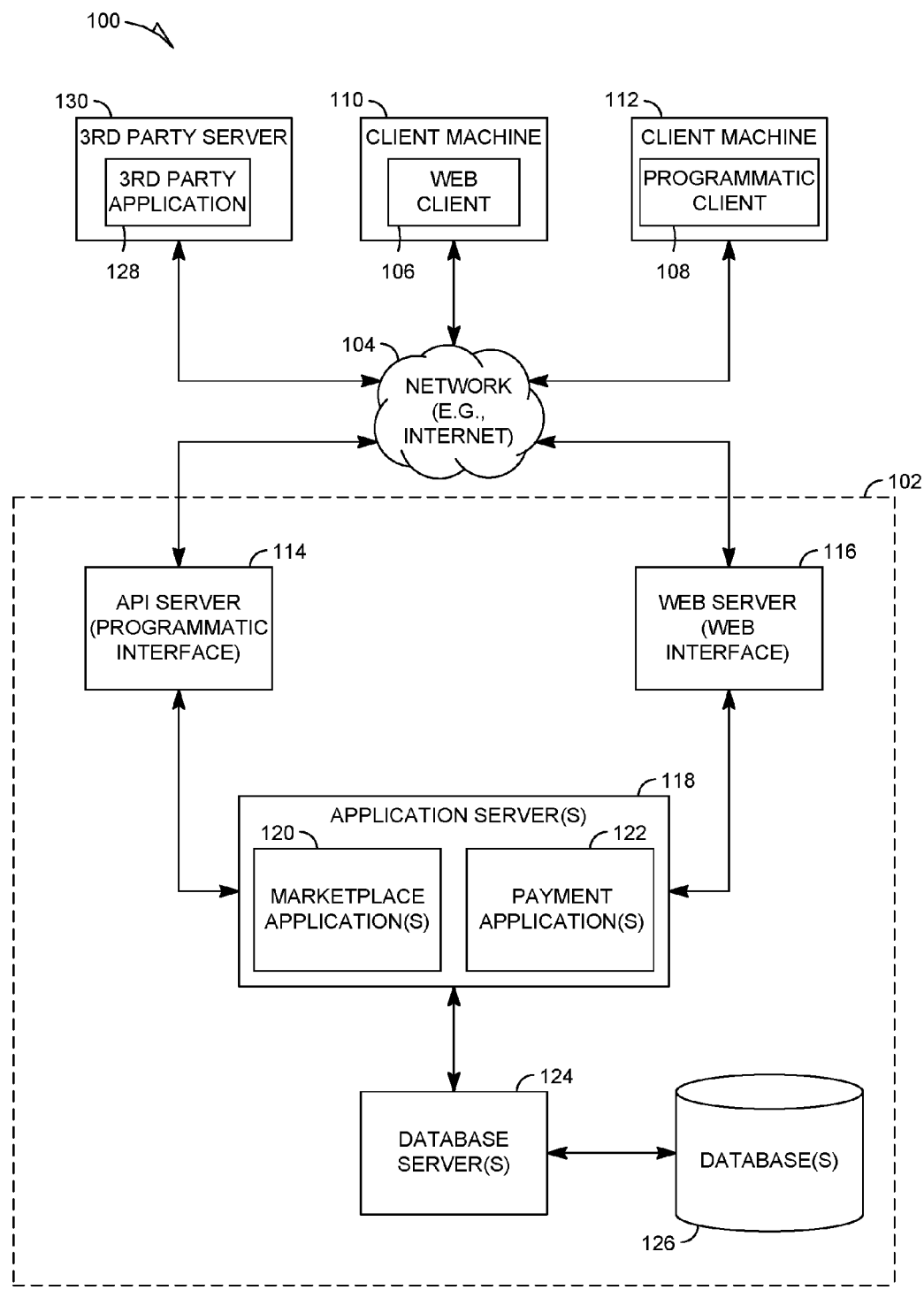
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
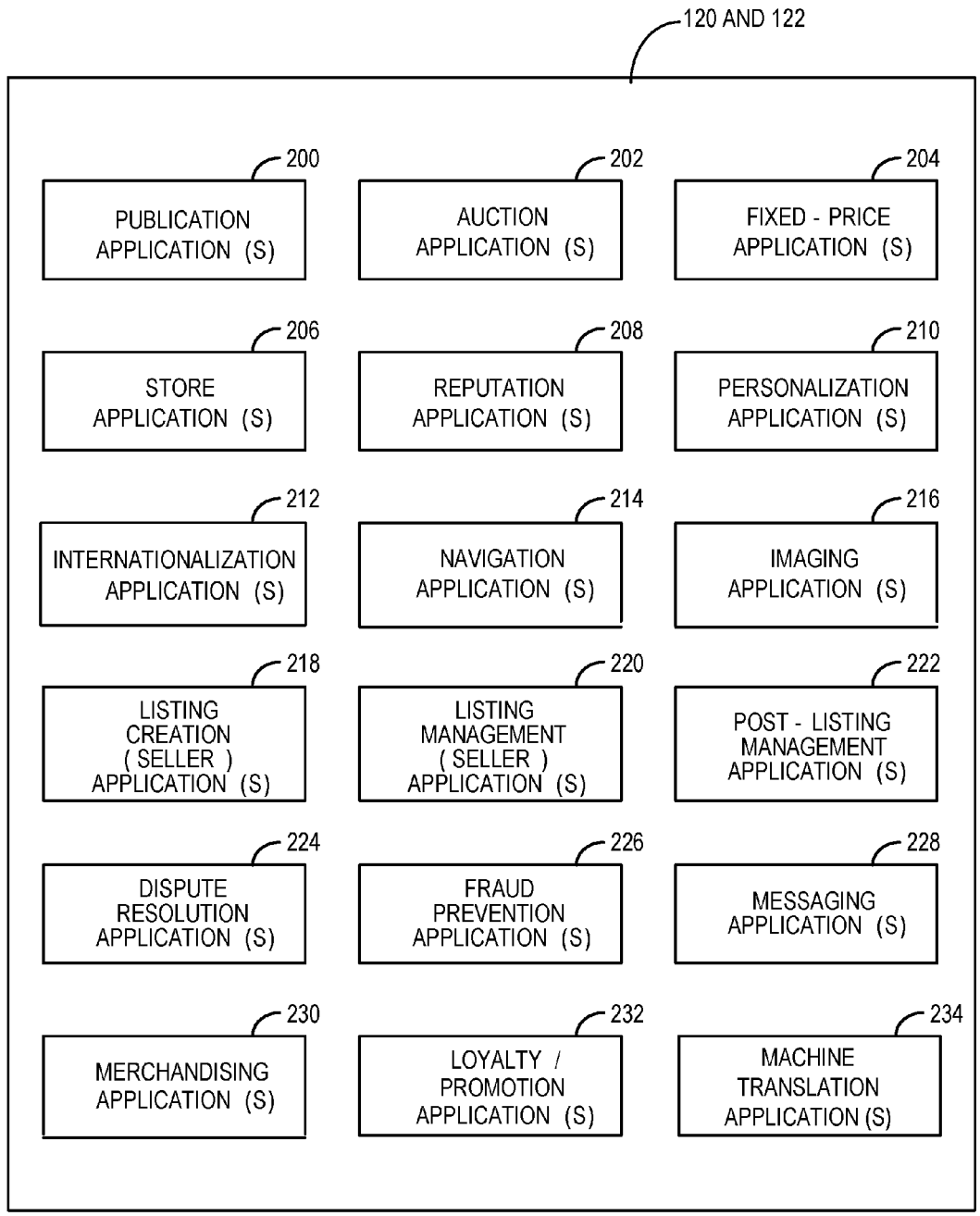
FIG. 2 is a block diagram illustrating marketplace and payment applications and that, in one example embodiment, are provided as part of application server(s) in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-ft-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A machine translation application 234 may translate a query in a first language to a query in a second language, obtain and build an ontology based on keywords of the query in the first language combined with user feedback indicating the relevancy of a result set obtained by the query that is translated into the second language. This ontology is defined by the users of the first language and may be developed from measuring the relevancy of the result set. A more detailed view of a machine translation application in accordance with an embodiment is seen in FIG. 2A.

Figure 2A:
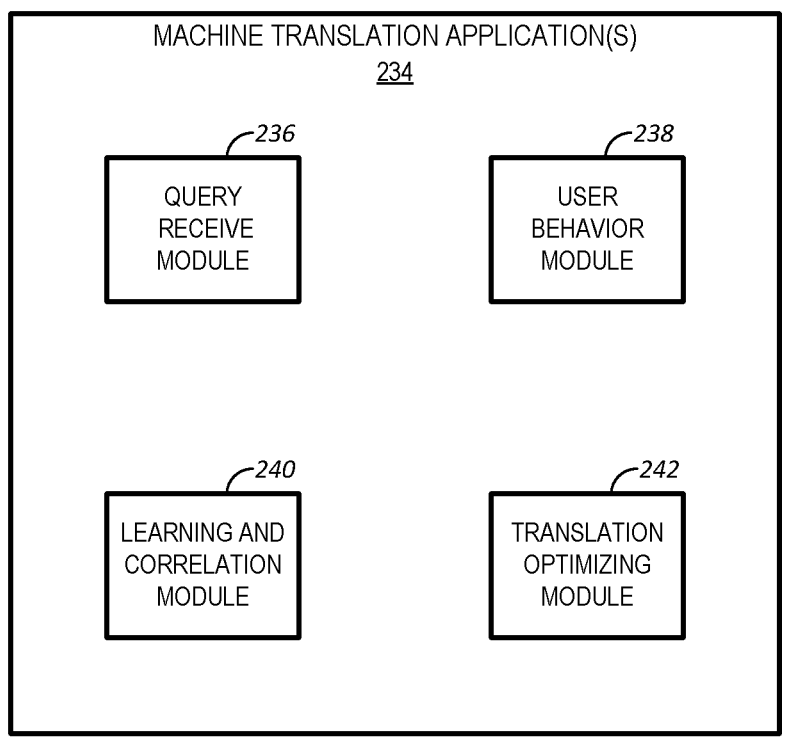
FIG. 2A is a block diagram illustrating an example machine translation application according to an example embodiment.

FIG. 2A is a block diagram illustrating an example machine translation applications 234, according to an example embodiment. The machine translation applications 234 comprise query receive module 236, user behavior module 238, learning and correlation module 240, and translation optimizing module 242. Query receive module 236 may receive user queries and result sets as more fully discussed with respect, to both system 320 and system 360 in FIG. 3. User behavior module 238 may be used to determine whether user behavior has indicated that a user query is satisfied by a user result set, also as more fully discussed with respect to system 320 and system 360 in FIG. 3. Learning and correlation module 240 may be used in learning how to translate queries from one language to another language based on the assumption of parallel user behavior in different countries. Translation optimizing module 242 may be may be used to optimize translation of queries in the first language to queries in the second language.

Certain commercial service providers (e.g., eBay Inc.) may operate and provide transaction support technology in a number of countries. For this discussion a Spain site and a US site are used as examples. Each of the two sites may be distinct and have a different inventory of products and services. Each site hosts massive numbers of user sessions as described in U.S. patent application Ser. No. 14/194,582 entitled IMPROVEMENT OF AUTOMATIC MACHINE TRANSLATION USING USER FEEDBACK, filed on the same date as the filing date as this application, and incorporated herein by reference in its entirety. Each site can draw on the queries in the user sessions as described in the foregoing patent application. An assumption is made that users at the Spain site, who enter queries in Spanish, and users at the US site, who enter queries in English, act similarly when looking for certain products (e.g., they may seek the same features for the product). Further, some of the inventory at the two sites is the same, in that the same product may be offered in different countries. This then allows the assumption to be made that the most probable queries at the Spain site and the most probable queries at the US site have some correlation and, with some probability, may be translations of each other, or parallel data. Also, the queries may exhibit a particular user behavior. In one embodiment the user behaviour may be clicking on an item in a result set, which may be viewed as a positive user behavior. The positive behavior to a translation of an item description may be characterized by clicking "positive" links on the website, e.g., act towards reading further details on the respective item, or, for example, clicking on the "bid", "buy it now", "watch" or similar activity. In one embodiment, the most clicked-on items in the result set for a query at the Spain site and the most clicked-on items in the result set for a query at the US site may be considered to have some correlation as well. If the products are constrained (e.g., come from the same category, and have similar aspects), the assumption may be made that the data in the queries are parallel data in a machine translation sense.

Potentially "negative" signals are considered as well. Negative signals may be if the user does NOT click on the positive links and/or cancels their action of the current research. A more "negative" signal is if the user clicks on a button, which may appear in the user interface, to turn off machine translation.

The foregoing behaviors may be considered implicit positive signals and implicit negative signals. There may also be explicit "positive" signals and explicit "negative" signals. An explicit positive signal may be a user sending a mark, for example a star rating, that indicates that the result set was helpful. An explicit negative signal may be if the user provides a mark, for example a star rating, with a user rating that the translation is not helping and/or is misleading. Other user behavior may be potentially negative. For example, a mid-range star rating, for example 3 out of 5, may be viewed as potentially negative.

Both positive and negative user behaviors (including positive, potentially negative and clearly negative ones) may be used in improving the machine translation. Good translations (evoking a positive user behavior) will be statistically rewarded, and more negative translations (evoking a potentially negative and/or a clearly negative user behaviour) will be statistically punished. This scoring will be used on the units/entries/"events" in statistical models that lead to a specific machine translation output.

Consequently since the data discussed above, under the recited conditions, or constraints, can be considered parallel data, the system may not need to look for information from a product vendor or from user feedback or the like, for machine translation. Instead, the system can extract parallel data from the system's own databases, given that large transaction processing systems may host millions of user sessions daily and can monitor user sessions in nearly real time, as discussed in the above patent application. It follows that the above behavior model may aid the system in learning how to translate queries from one language to another language based on the above assumption of parallel user behavior in different countries. In one embodiment, if a user at the US site is looking for an iPhone with certain features, the probability that a user at the Spain site, when looking for an iPhone will seek similar features for the iPhone, may be high. This is a constraint that may allow finding the best, or very good, translations even without expecting either user to tell the system, by feedback or otherwise, that one query is a translation of another query. In other words, user behavior may be the aligning context between queries made in the different countries and in different languages.

Assuming that a user at the US site queries for a device in the category of electronics at the US site and the device in the result set is an iPhone, and the user clicks on the iPhone, if a user performs the same query at the Spain site, and it is the same category, namely electronics, the system may understand in Spanish without any translation, that the query is for an iPhone in the result set. If the user at the Spain site then clicks on the iPhone in the result set, there is a calculable probability that the query at the Spain site and the query at the US site are the same. The system would then learn from defining the category, some restraining context such as aspects, the result set, and the action taken on the result set, in different countries, both queries, that at the Spain site and that at the US site, have a correlation and may be translations of each other. The constraint need not be a brand, as in the case of an iPhone, which carries the APPLE™ brand. The constraint can be any feature of the queried product. For example, if there is a query for a dress at the Spain site and a query for a dress at the US site, the constraint may be aspects as discussed above, and the system may learn that the two queries may be translations of each other. The constraints need not be aspects. The constraint may be a bar code, which is the same for the product at the Spain site and the product at the US site. Or the constraint may be a seller selling the same product at the two sites. Such constraints may aid the system in identifying queries that may be translations of each other, from which the system can learn for future query translations. This can be the case even in new languages the system has never made translations for in the past. User behavior implies query similarity as a statistical probability. Further, the more of this type of example that the system encounters, the more confidence can be placed in the assumption that the behavior model indicates that queries in different languages may be translations of each other.

Figure 3:
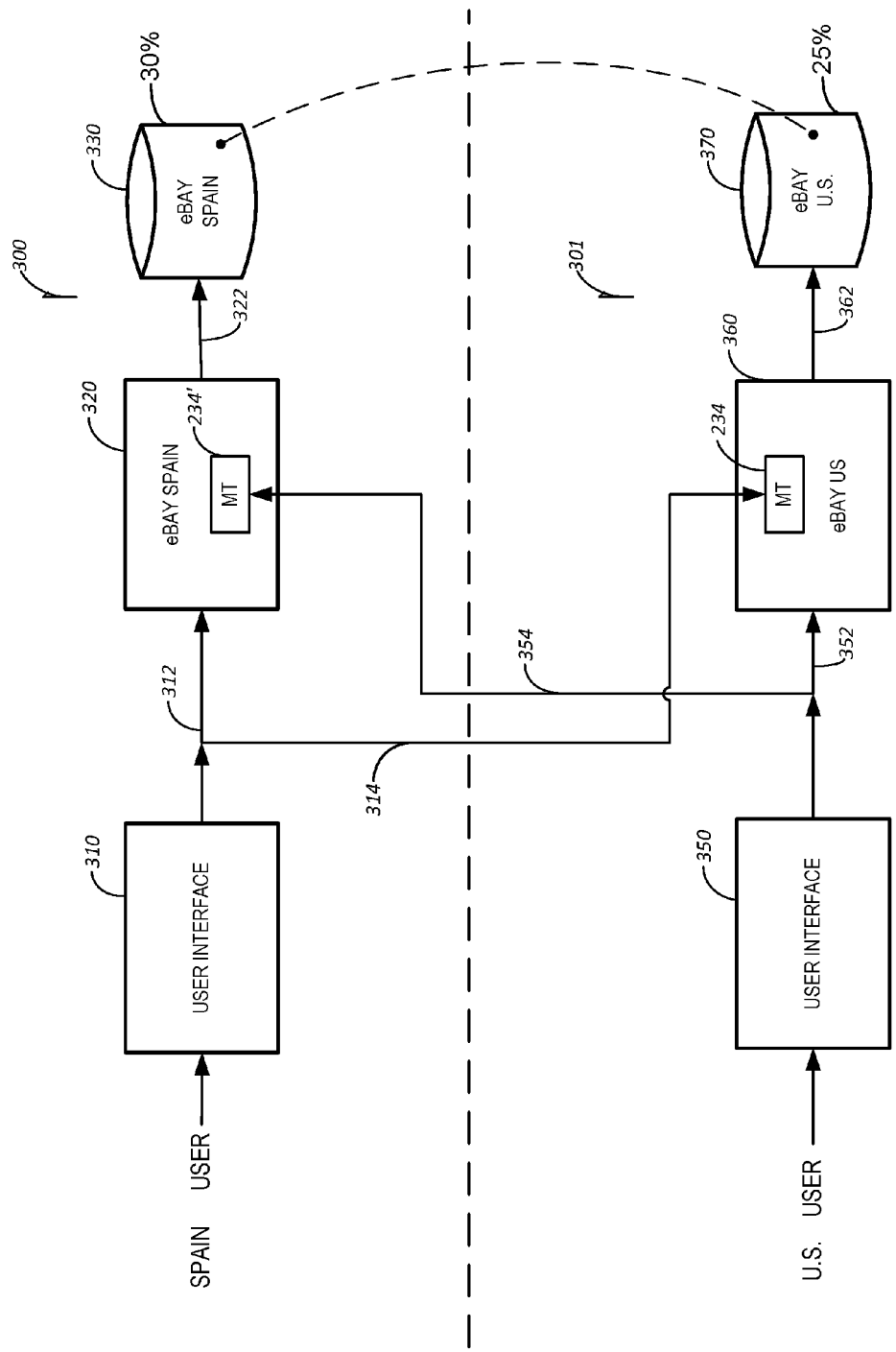
FIG. 3 is a block diagram illustrating two systems for automatic extraction of multilingual dictionary items from non-parallel, multilingual, semi-structured data according to an example embodiment.

FIG. 3 is a block diagram illustrating two systems for automatic extraction of multilingual dictionary items from non-parallel, multilingual, semi-structured data, according to an example embodiment. Publication system 300, which may be a publication system (e.g., such as eBay Spain), comprises user interface 310, which may be similar to machines 110, 112 or 130 of FIG. 1. User interface 310 is coupled to the publication system such as eBay Spain at 320, which may include MT application 234' which may be the same or similar to machine translation application 234 of FIG. 2. System 320 may be similar to system 102 of FIG. 1. System 320 may be coupled to, or may include, database 330.

Publication system 301 includes components that may be the same as, or similar to, those of publication system 300. User interface 350 is coupled to system 360, which may include MT application 234. System 360 may be coupled to, or may include, database 370. Line (or bus) 352 that couples user interface 350 to system 360 is also coupled to MT application 234' of system 320. While interfaces 310 and 350 are illustrated as a single interface, each of the boxes 310 and 350 may comprise a plurality of user interfaces. Line 352 transmits user queries as well as user listing selections from result sets from user interface 350 to both system 360 and to the MT application 234' of system 320. Line 312 functions similarly with respect to systems 320 and MT application 234 of system 360. Similarly, line (or bus) 312 that couples user interface 310 to system 320 is also coupled to MT application 234 of system 360. Line 352 functions similarly to line 312, but with respect to system 360 and MT application 234' of system 320. In the case of each system 300 and 301, user queries, and user selections from result sets, may be respectively transmitted to the MT application of the opposite system, among other functions performed by systems 300 and 301. While lines 314 and 354 are illustrated as originating from user interfaces, 310 and 350, respectively, one of ordinary skill in the art will readily recognize that they could originate from within systems 320 and 360, respectively. If the lines originate from the respective user interfaces then the receiving system may count the number of clicks and total the respective percentages discussed below. If the lines originate from the respective systems those systems may perform those functions before transmitting the information to the receiving system.

Because some of the products at the US site and the Spain site are the same or similar, user behavior with respect to products at either site, with appropriate constraints, can be used to align queries in the two different languages for machine translation purposes. If the US site 301 determines, for example via MT application 234, that there are 100 users at the Spain site that enter a query for a product, with a constraint as discussed above, and obtain result sets that result in a successful outcome (e.g., the user clicks on the result set) for, in one embodiment, 30% of the queries, then, depending on a threshold probability the system may set, the Spanish language query may be correlated with an English language query for a product, with a similar constraint. Similarly, if the Spain site 300 determines, for example via MT application 234', that there are 1,000 users at the US site that enter a product query with the above constraint and obtain result sets that result in a positive outcome (e.g. the user clicks on the result set) for, in one embodiment, 25% of the queries, then, depending on a threshold probability the system may set, the English language query may be correlated with a Spanish language query for the product with a similar constraint. These scenarios are seen by the dash line connecting database 330 and database 370 of FIG. 3. The above percentages may be viewed as a threshold which may be set at any level that may be deemed appropriate to indicate that the percentages are statistically significant. Again, as discussed above, the constraint may be aspects, a bar code which is the same for the product at the Spain site and the product at the US site, or a seller selling the same product at the two sites, among other things. Because the systems 300 and 301 know, via MT applications 234' and 234, the kind of process the users went through in the two countries, and these products may be correlated—iPhone, black, etc., it follows that the systems 300 and 301 can correlate (or indicate to be parallel data) what the user sees at the Spain site and what the user sees at the US site with a certain probability.

Figure 4:
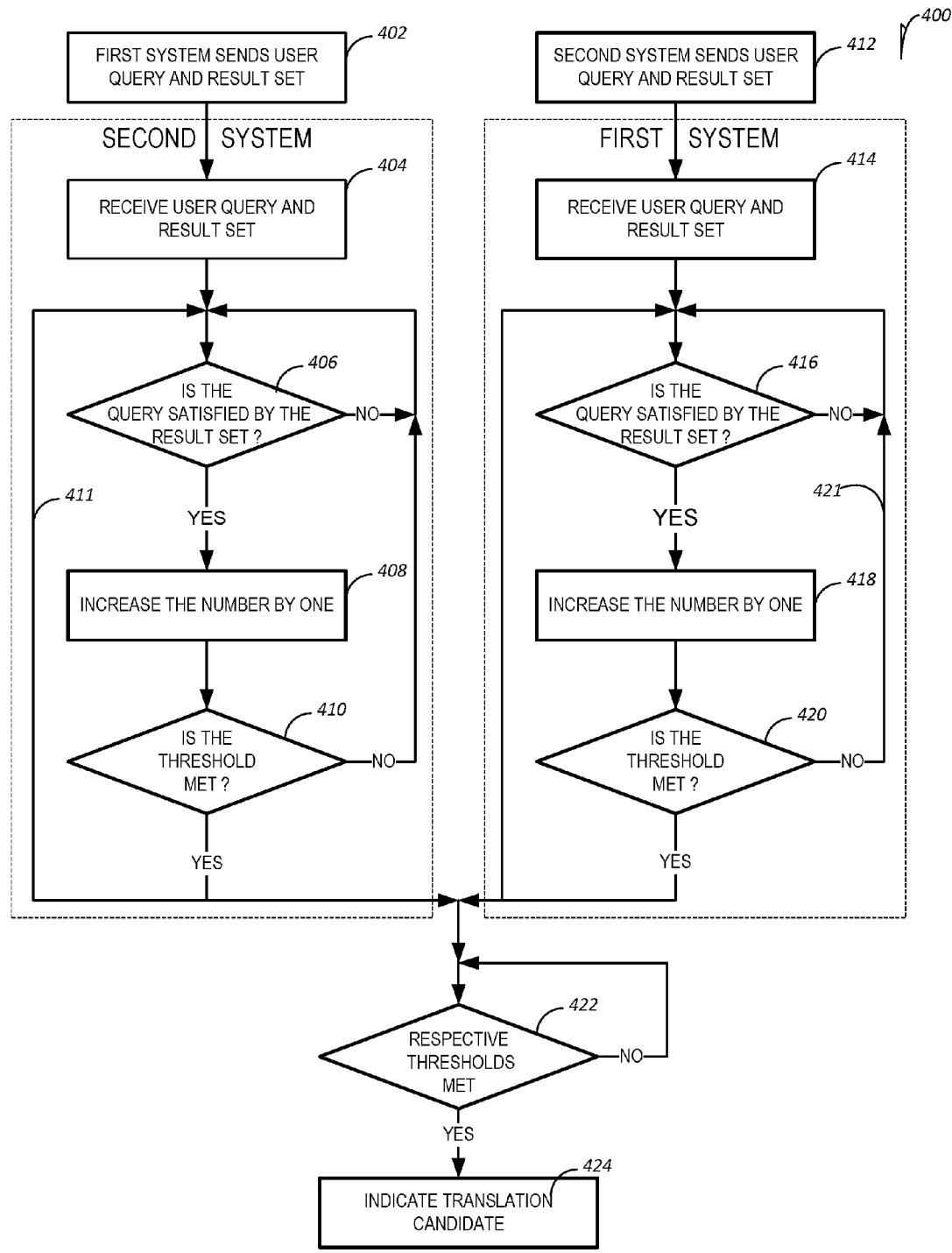
FIG. 4 is a flowchart illustrating an example method, consistent with various embodiments.

FIG. 4 is a flowchart illustrating an example method 400, consistent with various embodiments. The vertical leg beginning with 404 describes activities at a second system after receiving, at 402, user queries and result sets from a first system. The vertical leg beginning with 414 describes activities at a first system, after receiving, at 412 user queries and result sets from a second system. The first system may be eBay US 360 in FIG. 3 and the second system may be eBay Spain 320 in FIG. 3. At 402 the first system sends user queries that are in a given category and that exhibit a constraint, as explained in FIG. 3, and result sets that correspond to the user queries, which are received at 404 by the second system. The receiving may be accomplished by query receive module 236 of FIG. 2A. At 406 the second system tests to determine whether the received query is satisfied by the result set, for example by a user behavior such as clicking on a product in the result set. This may be accomplished by user behavior module 238 of FIG. 2A. If the NO branch is taken, the system waits for the next user query and result set before making the test on that new user query and result set. If the YES branch is taken, the number of user queries that are satisfied by their result sets is increased by one at 408.

At 410 a test is made to determine whether the threshold discussed in FIG. 3 has been met. If the NO branch is taken the system awaits the next increase to the number of user queries that are satisfied by their result sets at 410 before making the next test to determine whether the threshold is met. If the YES branch is taken at 410, then the threshold set by the system has been met and the second system sends a signal to decision block 422 which may be continually testing to determine whether the respective thresholds of the first system and the second system have been met. The vertical leg beginning at 412 operates as described for the vertical leg that begins at 402, except that the activity is taken at the first system after the second system sends user queries that are in a given category and that exhibit a constraint, as explained in FIG. 3, and result sets that correspond to the user queries, which are received at 414 by the second system. The rest of the vertical 412 leg operates as explained for the vertical 402 leg. When the threshold is met for the second system as indicated by the YES branch at decision 420, a signal is sent to decision block 422 which, as mentioned above, may be continually testing to determine whether the respective thresholds of both the first system and the second system have been met. When signals from the YES branch of 410 and from the YES branch of 420 reach decision 422, the YES branch is taken at 422 and the queries from the first system and the queries from the second system may be indicated to be translations of each other as at 424. The frequency of going through the YES branch versus the NO branch of 410 and 420 might support in calculating the confidence of the translation candidates. This is indicated symbolically at lines 411 and 421 where going through the YES and NO branches may be used in calculation (not shown).

Example Mobile Device

Figure 5:
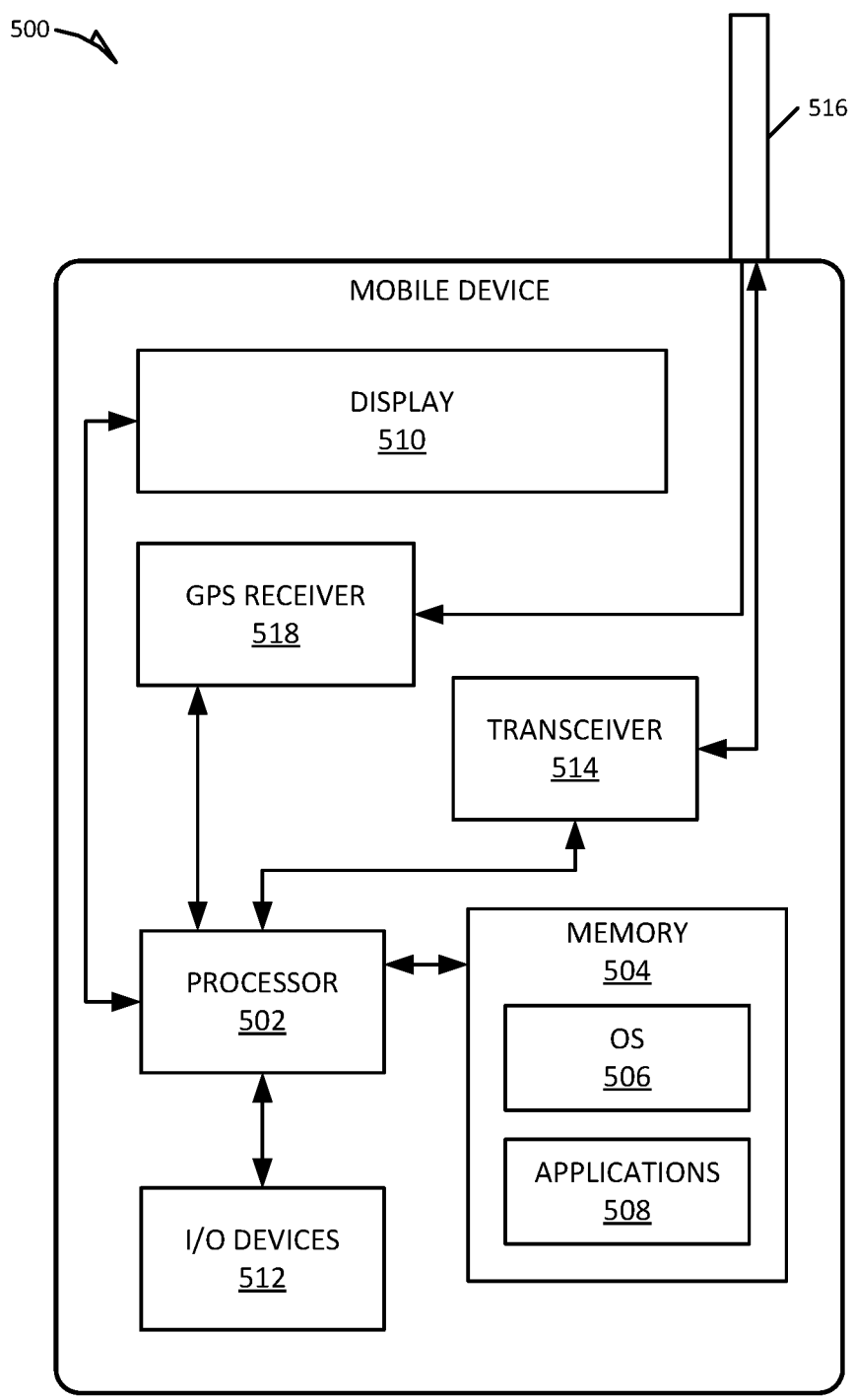
FIG. 5 is a block diagram illustrating a mobile device, according to an example embodiment.

FIG. 5 is a block diagram illustrating a mobile device 500, according to an example embodiment. The mobile device 500 may include a processor 502. The processor 502 may be any of a variety of different types of commercially available processors suitable for mobile devices (for example, an XScale architecture microprocessor, a microprocessor without interlocked pipeline stages (MIPS) architecture processor, or another type of processor 502). A memory 504, such as a random access memory (RAM), a flash memory, or other type of memory, is typically accessible to the processor 502. The memory 504 may be adapted to store an operating system (OS) 506, as well as application programs 508, such as a mobile location enabled application that may provide LBSs to a user. The processor 502 may be coupled, either directly or via appropriate intermediary hardware, to a display 510 and to one or more input/output (I/O) devices 512, such as a keypad, a touch panel sensor, a microphone, and the like. Similarly, in some embodiments, the processor 502 may be coupled to a transceiver 514 that interfaces with an antenna 516. The transceiver 514 may be configured to both transmit and receive cellular network signals, wireless data signals, or other types of signals via the antenna 516, depending on the nature of the mobile device 500. Further, in some configurations, a GPS receiver 518 may also make use of the antenna 516 to receive GPS signals.

Modules, Components and Logic

Certain embodiments are described herein as including logic or a number of components, modules, or mechanisms. Modules may constitute either software modules (e.g., code embodied (1) on machine-readable storage or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure processor 502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 502 or processor-implemented modules. The performance of certain of the operations may be distributed among the one or more processors 502, not only residing within a single machine, but deployed across a number of machines. In some example embodiments, the processor 502 or processors 502 may be located in a single location (e.g., within a home environment, an office environment or as a server farm), while in other embodiments the processors 502 may be distributed across a number of locations.

The one or more processors 502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor 502, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 502 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 502), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
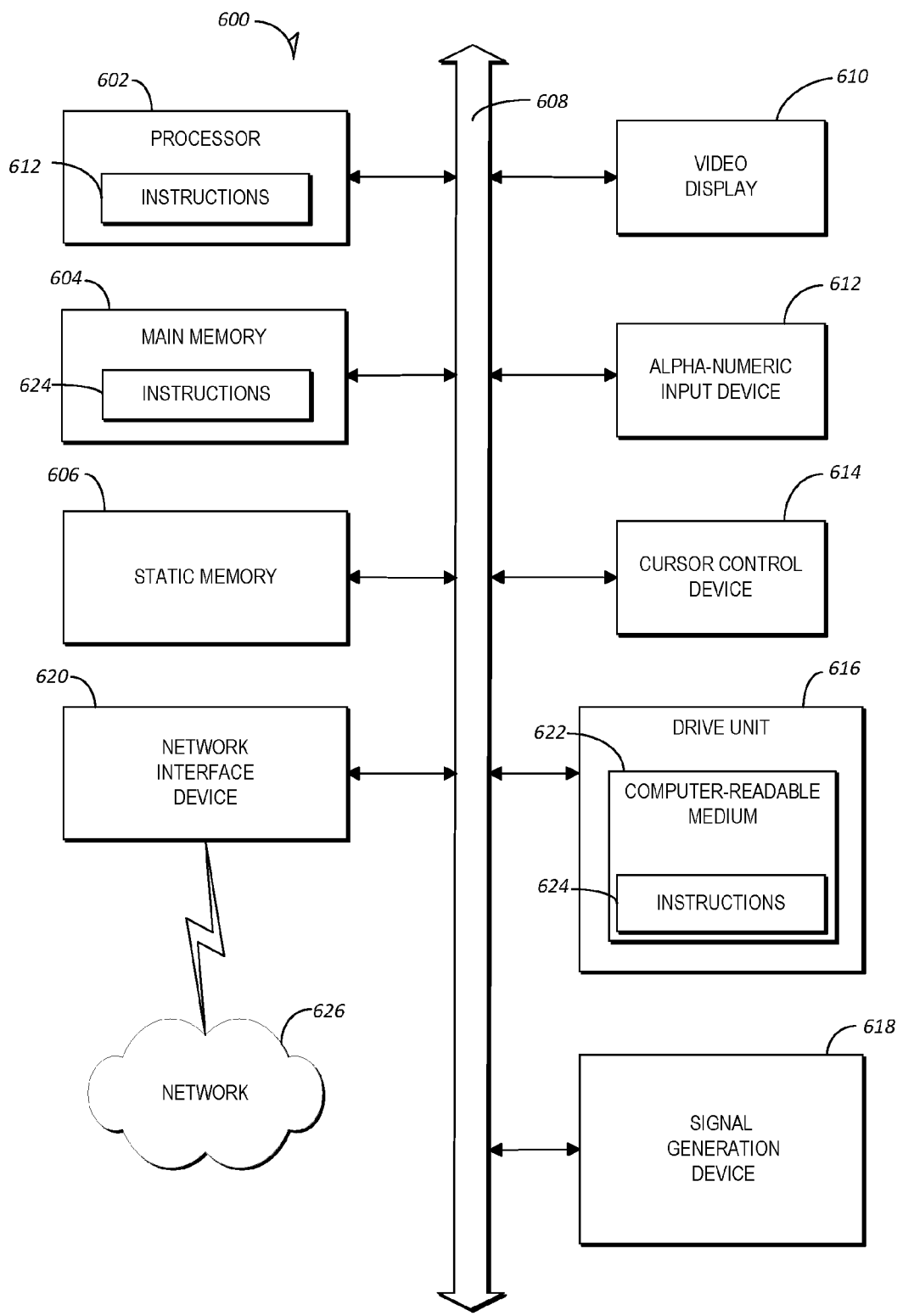
FIG. 6 is a block diagram of a machine in the example form of a computer system within which instructions may be executed for causing the machine to perform any one or more of the methodologies discussed herein.

FIG. 6 is a block diagram of machine in the example form of a computer system 600 within which instructions 624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation (e.g., cursor control) device 614 (e.g., a mouse), a disk drive unit 616, a signal generation device 618 (e.g., a speaker) and a network interface device 620.

Machine-Readable Medium

The disk drive unit 616 includes a computer-readable medium 622, which may be hardware storage, on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting computer-readable media 622.

While the computer-readable medium 622 is shown in an example embodiment to be a single medium, the term "computer-readable medium" may include a single medium or multiple media (e.g., a centralized or distributed database, and/or associated caches and servers) that store the one or more instructions 624 or data structures. The term "computer-readable medium" shall also be taken to include any tangible medium that is capable of storing, encoding or carrying instructions 624 for execution by the machine and that cause the machine to perform any one or more of the methodologies of the present disclosure or that is capable of storing, encoding or carrying data structures utilized by or associated with such instructions 624. The term "computer-readable medium" shall accordingly be taken to include, but not be limited to, solid-state memories, and optical and magnetic media. Specific examples of computer-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method of machine translation comprising:
receiving at a second publication system, from a first publication system, a first plurality of user queries that are in a first language, that are in a category and that exhibit a constraint, and a first plurality of result sets, respective ones of which correspond to respective ones of the first plurality of user queries and that exhibit a first group of implicit user behavior with respect to the first plurality of user result sets;
receiving, at the first publication system, from the second publication system, a second plurality of user queries that are in a second language, that are in the category and that exhibit the constraint, and a second plurality of result sets, respective ones of which correspond to respective ones of the second plurality of user queries and that exhibit a second group of implicit user behavior with respect to the second plurality of result sets;

detecting, by a user behavior module of a machine translation application in the second publication system, implicit user behavior in the first group of implicit user behavior that indicates that at least some of the first plurality of user queries are satisfied by respective ones of the first plurality of result sets;

detecting, by a user behavior module of a machine translation application in the first publication system, implicit user behavior in the second group of implicit user behavior that indicates that at least some of the second plurality of user queries are satisfied by respective ones of the second plurality of result sets;

detecting that the at least some of the first plurality of user queries and the at least some of the second plurality of user queries satisfy respective thresholds; and responsive to detecting that the at least some of the first plurality of first user queries and the at least some of the second plurality of user queries satisfy respective thresholds, providing an indication to at least one of the machine translation application in the second publication system or the machine translation application in the first publication system that at least one of the first plurality of user queries and at least one of the second plurality of user queries are likely to be translations of each other.

2. The method of claim 1 wherein the constraint comprises one of aspects, a bar code or a seller.

3. The method of claim 1 wherein the first group of implicit user behavior and the second group of implicit user behavior comprise one of positive behavior, potentially negative behavior or clearly negative behavior.

4. The method of claim 1 wherein the respective thresholds comprise a first percentage of the plurality of the first user queries that is satisfied by result sets responsive to the plurality of first user queries, and a second percentage of the second plurality of user queries that is satisfied by result sets responsive to the plurality of second user queries, and the satisfaction is based on one of positive user behavior, potentially negative user behavior, or clearly negative user behavior.

5. One or more computer-readable hardware storage device having embedded therein a set of instructions which, when executed by one or more processors of a computer, causes the computer to execute operations comprising:

receiving at a second publication system, from a first publication system, a first plurality of user queries that are in a first language, that are in a category and that exhibit a constraint, and a first plurality of result sets, respective ones of which correspond to respective ones of the first plurality of user queries and that exhibit a first group of implicit user behavior with respect to the first plurality of user result sets;

receiving, at the first publication system, from the second publication system, a second plurality of user queries that are in a second language, that are in the category and that exhibit the constraint, and a second plurality of result sets, respective ones of which correspond to respective ones of the second plurality of user queries and that exhibit a second group of implicit user behavior with respect to the second plurality of result sets;

detecting, by a user behavior module of a machine translation application in the second publication system, implicit user behavior in the first group of implicit user behavior that indicates that at least some of the first plurality of user queries are satisfied by respective ones of the first plurality of result sets;

detecting, by a user behavior module of a machine translation application in the first publication system, implicit user behavior in the second group of implicit user behavior that indicates that at least some of the second plurality of user queries are satisfied by respective ones of the second plurality of result sets;

detecting that the at least some of the first plurality of user queries and the at least some of the second plurality of user queries satisfy respective thresholds; and responsive to detecting that the at least some of the first plurality of first user queries and the at least some of the second plurality of user queries satisfy respective thresholds, providing an indication to at least one of the machine translation application in the second publication system or the machine translation application in the first publication system that at least one of the first plurality of user queries and at least one of the second plurality of user queries are likely to be translations of each other.

6. The one or more computer-readable hardware storage device of claim 5 wherein the constraint comprises one of aspects, a bar code or a seller.

7. The one or more computer-readable hardware storage device of claim 5 wherein the first group of implicit user behavior and the second group of implicit user behavior comprise one of positive behavior, potentially negative behavior or clearly negative behavior.

8. The one or more computer-readable hardware storage device of claim 5 wherein the respective thresholds comprise a first percentage of the plurality of the first user queries that are satisfied by result sets responsive to the plurality of first user queries and a second percentage of the second plurality of user queries that are satisfied by result sets responsive to the plurality of second user queries, and the satisfaction is based on one of positive user behavior, potentially negative user behavior, or clearly negative user behavior.

9. A system comprising:

one or more computer processors and storage, at a second publication system, configured to:

receive, from a first publication system, a first plurality of user queries that are in a first language that are in a category and that exhibit a constraint, and a first plurality of result sets, respective ones of which correspond to respective ones of the first plurality of user queries and that exhibit a first group of implicit user behavior with respect to the first plurality of user result sets;

detect, by a user behavior module of a machine translation application at the second publication system, implicit user behavior in the first group of implicit user behavior that indicates that at least some of the first plurality of user queries are satisfied by respective ones of the first plurality result sets;

one or more computer processors and storage, at the first publication system, configured to:

receive, from the second publication system, a second plurality of user queries in a second language that that are in the category and that exhibit the constraint, and a second plurality of result sets that exhibit a second group of implicit user behavior with respect to the second plurality of result sets;

detect by a user behavior module of a machine translation application at the first publication system, implicit user behavior in the second group of implicit user behavior that indicates that at least some of the second plurality of user queries are satisfied by respective ones of the second plurality of result sets;

execute a decision application configured to detect that the at least some of the first plurality of user queries and the at least some of the second plurality of user queries satisfy respective thresholds; and execute a learning and correlation module configured, responsive to the detection that the at least some of the first plurality of first user queries and the at least some of the second plurality of user queries satisfy respective thresholds, to provide an indication to at least one of the machine translation application in the second publication system or the machine translation application in the first publication system that at least one of the first plurality of user queries and at least one of the second plurality of user queries are likely to be translations of each other.

10. The system of claim 9 wherein the constraint comprises one of aspects, a bar code or a seller.

11. The system of claim 9 wherein the first group of implicit user behavior and the second group of implicit user behavior comprises one of positive behavior, potentially negative behavior or clearly negative behavior.

12. The system of claim 9 wherein the respective thresholds comprise a first percentage of the plurality of the first user queries that are satisfied by result sets responsive to the plurality of first user queries and a second percentage of the second plurality of user queries that are satisfied by result sets responsive to the second plurality of user queries.

* * * * *